(12) United States Patent
Willett et al.

(10) Patent No.: US 9,037,463 B2
(45) Date of Patent: May 19, 2015

(54) EFFICIENT EXPLOITATION OF MODEL COMPLEMENTARINESS BY LOW CONFIDENCE RE-SCORING IN AUTOMATIC SPEECH RECOGNITION

(75) Inventors: Daniel Willett, Walluf (DE); Venkatesh Nagesha, Wayland, MA (US)

(73) Assignee: Nuance Communications, Inc., Burlington, MA (US)

( * ) Notice: Subject to any disclaimer, the term of this patent is extended or adjusted under 35 U.S.C. 154(b) by 22 days.

(21) Appl. No.: 13/518,409

(22) PCT Filed: May 27, 2010

(86) PCT No.: PCT/US2010/036319
§ 371 (c)(1),
(2), (4) Date: Jun. 22, 2012

(87) PCT Pub. No.: WO2011/149465
PCT Pub. Date: Dec. 1, 2011

(65) Prior Publication Data
US 2012/0259627 A1      Oct. 11, 2012

(51) Int. Cl.
*G10L 15/04* (2013.01)
*G10L 15/14* (2006.01)
*G10L 15/183* (2013.01)
*G10L 15/32* (2013.01)

(52) U.S. Cl.
CPC ............. *G10L 15/142* (2013.01); *G10L 15/183* (2013.01); *G10L 15/32* (2013.01)

(58) Field of Classification Search
CPC .................................. G10L 15/32; G10L 15/08
USPC .................................. 704/254, 247, 200, 231
See application file for complete search history.

(56) References Cited

U.S. PATENT DOCUMENTS

| | | | |
|---|---|---|---|
| 2002/0193991 A1* | 12/2002 | Bennett et al. | 704/247 |
| 2004/0148164 A1* | 7/2004 | Baker | 704/231 |
| 2005/0075877 A1* | 4/2005 | Minamino et al. | 704/254 |
| 2005/0080632 A1* | 4/2005 | Endo et al. | 704/277 |
| 2005/0144187 A1* | 6/2005 | Che et al. | 707/101 |
| 2008/0201147 A1* | 8/2008 | Han et al. | 704/254 |
| 2010/0004930 A1 | 1/2010 | Strope | |
| 2010/0030560 A1* | 2/2010 | Yamamoto | 704/257 |
| 2010/0121642 A1* | 5/2010 | Hori et al. | 704/254 |

FOREIGN PATENT DOCUMENTS

WO     9834217 A1     8/1998
WO     0058945 A1     10/2000

OTHER PUBLICATIONS

International Search Report and Written Opinion mailed Nov. 4, 2010 for PCT Application No. PCT/US2010/036319.

* cited by examiner

Primary Examiner — Jakieda Jackson
(74) Attorney, Agent, or Firm — Banner & Witcoff, Ltd.

(57) ABSTRACT

A method for speech recognition is described that uses an initial recognizer to perform an initial speech recognition pass on an input speech utterance to determine an initial recognition result corresponding to the input speech utterance, and a reliability measure reflecting a per word reliability of the initial recognition result. For portions of the initial recognition result where the reliability of the result is low, a re-evaluation recognizer is used to perform a re-evaluation recognition pass on the corresponding portions of the input speech utterance to determine a re-evaluation recognition result corresponding to the re-evaluated portions of the input speech utterance. The initial recognizer and the re-evaluation recognizer are complementary so as to make different recognition errors. A final recognition result is determined based on the re-evaluation recognition result if any, and otherwise based on the initial recognition result.

20 Claims, 3 Drawing Sheets

EFFICIENT EXPLOITATION OF MODEL COMPLEMENTARINESS BY LOW CONFIDENCE RE-SCORING IN AUTOMATIC SPEECH RECOGNITION

TECHNICAL FIELD

The invention generally relates to computer processor implemented systems for automatic speech recognition (ASR), and more specifically to ASR systems using multiple recognition passes.

BACKGROUND ART

An automatic speech recognition (ASR) system tries to determine a representative meaning (e.g., text) corresponding to input speech. Typically, the input speech is processed into a sequence of digital frames. Each frame can be thought of as a multi-dimensional vector that represents various characteristics of the speech signal present during a short time window of the speech. In a continuous recognition system, variable numbers of frames are organized as "utterances" representing a period of speech followed by a pause which in real life loosely corresponds to a spoken sentence or phrase.

The system compares the input utterances to find acoustic models that best match the vector sequence characteristics and determines corresponding representative text associated with the acoustic models. Modern acoustic models typically use state sequence models such as Hidden Markov Models that model speech sounds (usually phonemes) using mixtures of probability distribution functions, typically Gaussians. Phoneme models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Speech recognition applications include both offline batch mode applications (e.g., transcription applications, voicemail2text, etc.) and online real time speech recognition applications (e.g., dictation applications, command & control, voice search, network ASR, etc.). In state-of-the-art speech offline transcription systems, it is common practice to combine multiple recognition systems that apply different statistical models and/or feature extraction schemes. Result combination schemes such as ROVER and CNC are popular and known to reliably exploit complementary systems for accuracy improvement. See, for example, Fiscus, J. G., *A Post-Processing System To Yield Reduced Error Word Rates: Recognizer Output Voting Error Reduction (ROVER)*, In IEEE Workshop on Automatic Speech Recognition and Understanding, pp. 347-354, 1997; G. Evermann, P. C. Woodland, *Posterior Probability Decoding, Confidence Estimation And System Combination*, Proc. Speech Transcription Workshop, 2000; L. Mangu, E. Brill, A. Stolcke, *Finding Consensus In Speech Recognition: Word Error Minimization And Other Applications Of Confusion Networks*, Computer Speech and Language 14 (4), 291-294, 2000; all incorporated herein by reference. The term "complementary" is understood in the art to refer to systems that make different recognition errors.

In online real time speech recognition applications, the applicability of such system combination schemes has been very limited due to the constraint of performing recognition in real-time with little latency allowed. The application and combination of multiple recognition systems that independently decode an input speech utterance has been largely limited to multi-core architectures, and even on such platforms, the computational cost of having an additional full recognition pass is rarely, barely worth it.

SUMMARY

Embodiments of the present invention are directed to a method for speech recognition that uses an initial recognizer to perform an initial speech recognition pass on an input speech utterance to determine an initial recognition result corresponding to the input speech utterance, and a reliability measure reflecting a per word reliability of the initial recognition result. For portions of the initial recognition result considered unreliable (i.e., the reliability measure is low), a re-evaluation recognizer is used to perform a re-evaluation recognition pass on the corresponding portions of the input speech utterance to determine a re-evaluation recognition result corresponding to the re-evaluated portions of the input speech utterance. This re-evaluation can be constrained to only re-assess the similarly likely result options as identified in the first pass recognition. The initial recognizer and the re-evaluation recognizer are complementary so as to make different recognition errors. A final recognition result is determined based on the re-evaluation recognition result if any, and otherwise based on the initial recognition result.

The initial recognition result may be represented as a confusion network, which may have arcs with associated probability values that are used for the reliability measure. In some embodiments, the re-scoring pass is constrained to perform re-scoring of those arcs in the confusion network that have a similar probability to that of the most likely parallel arc.

The initial recognizer may actually be multiple combined recognizers that yield a combined recognition result to form the initial recognition result. The method may be performed in an online real time speech recognition application such as a dictation application, or an offline batch mode speech recognition application. The initial recognizer and the re-evaluation recognizer may use different complementary acoustic models and/or language models.

Embodiments also include a speech recognition system using a method according to any of the above, and a computer program product implemented in a computer readable storage medium for speech recognition and including program code for performing a method according to any of the above.

DETAILED DESCRIPTION OF SPECIFIC EMBODIMENTS

Embodiments of the present invention offer improved performance in an automatic speech recognition system by rescoring the low-confidence parts of an initial recognizer output using a second complementary re-evaluation recognizer. Experiments have achieved accuracy gains similar to computationally expensive dual decoding and result combination schemes such as ROVER and CNC, but without requiring parallel or successive decoding with multiple recognition systems. Two different complementary statistical classifiers (i.e., different speech recognizers with different acoustic and/or language models) are arranged as an initial recognizer and a re-evaluation recognizer, and a reliability measure on the result of the initial recognizer provides a basis for identifying unreliable subsets of the initial recognition result.

The different complementary recognizers may have acoustic and/or language models that are trained on different data so as to make different kinds of recognition errors, but that is not necessarily a requirement. For example, the models might be trained on the same training data, but using different model configurations or/and weights on the training data so as to be complementary in the recognition performance. What matters is that the different recognizers and their models are different in the sense of complementariness to have different recognition errors (at least to some degree). Specifically, it is not necessary for one of the recognizers to have better recognition performance (e.g., more complex, higher resolution, trained on more/better data) than the other recognizer in order to realize overall improved system performance.

Figure 1:
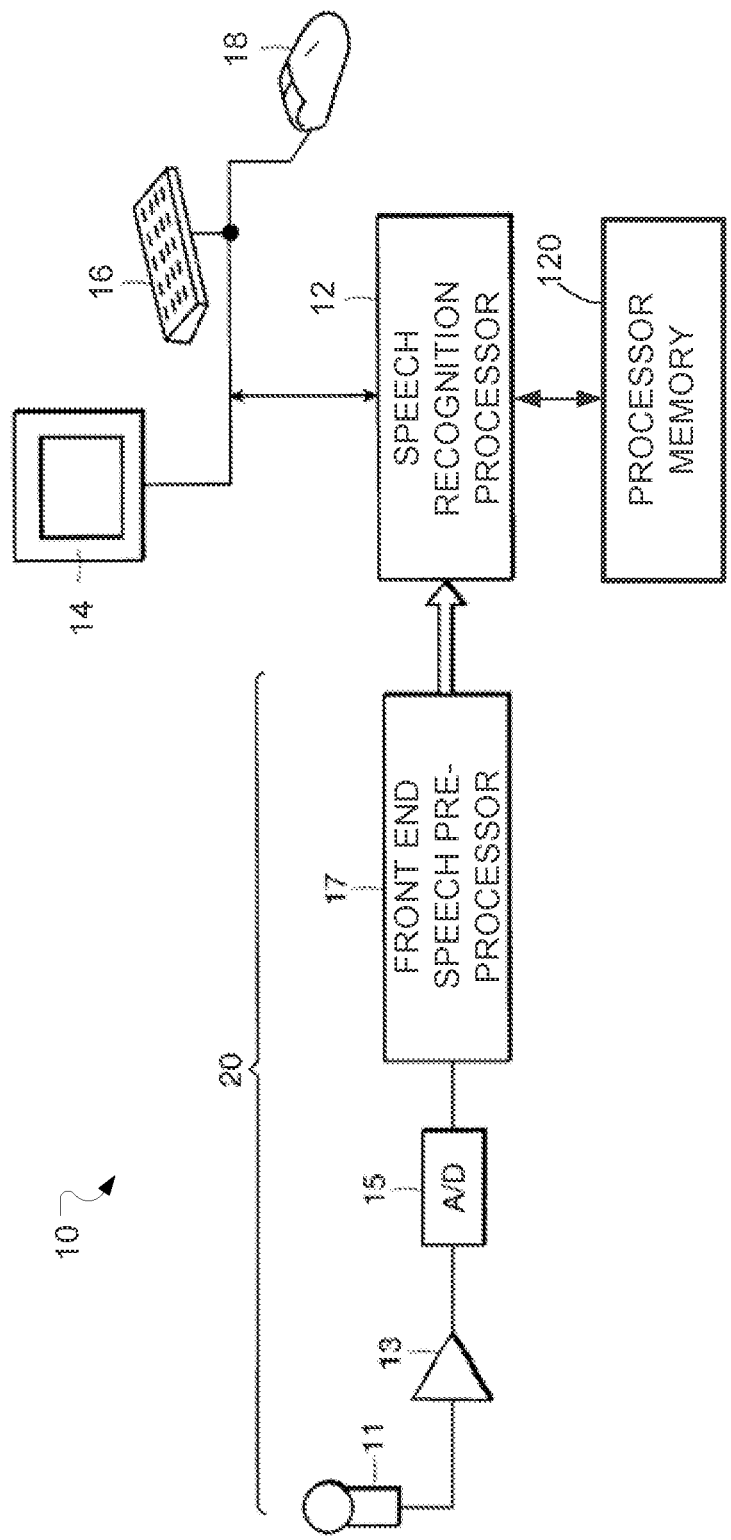
FIG. 1 is a block diagram representing various hardware components of an embodiment of a speech recognition system according to the present invention.

FIG. 1 shows various hardware components of an embodiment of an ASR system according to the present invention. A computer system 10 includes a speech input microphone 11 which is connected through a suitable preamplifier 13 to an analog-to-digital (A/D) converter 15. A front-end speech preprocessor 17 typically performs a Fourier transform so as to extract spectral features to characterize the input speech as a sequence of representative multi-dimensional vectors. A speech recognition processor 12, e.g., an Intel Core i7 processor or the like, is programmed to run one or more specialized computer software processes to determine a recognition output corresponding to the speech input, for example, a dictation process. Processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10. Of course, many other typical arrangements are also familiar such as an ASR implemented for a mobile device such as a cell phone, ASR for the cabin of an automobile, client-server based ASR, etc.

Figure 2:
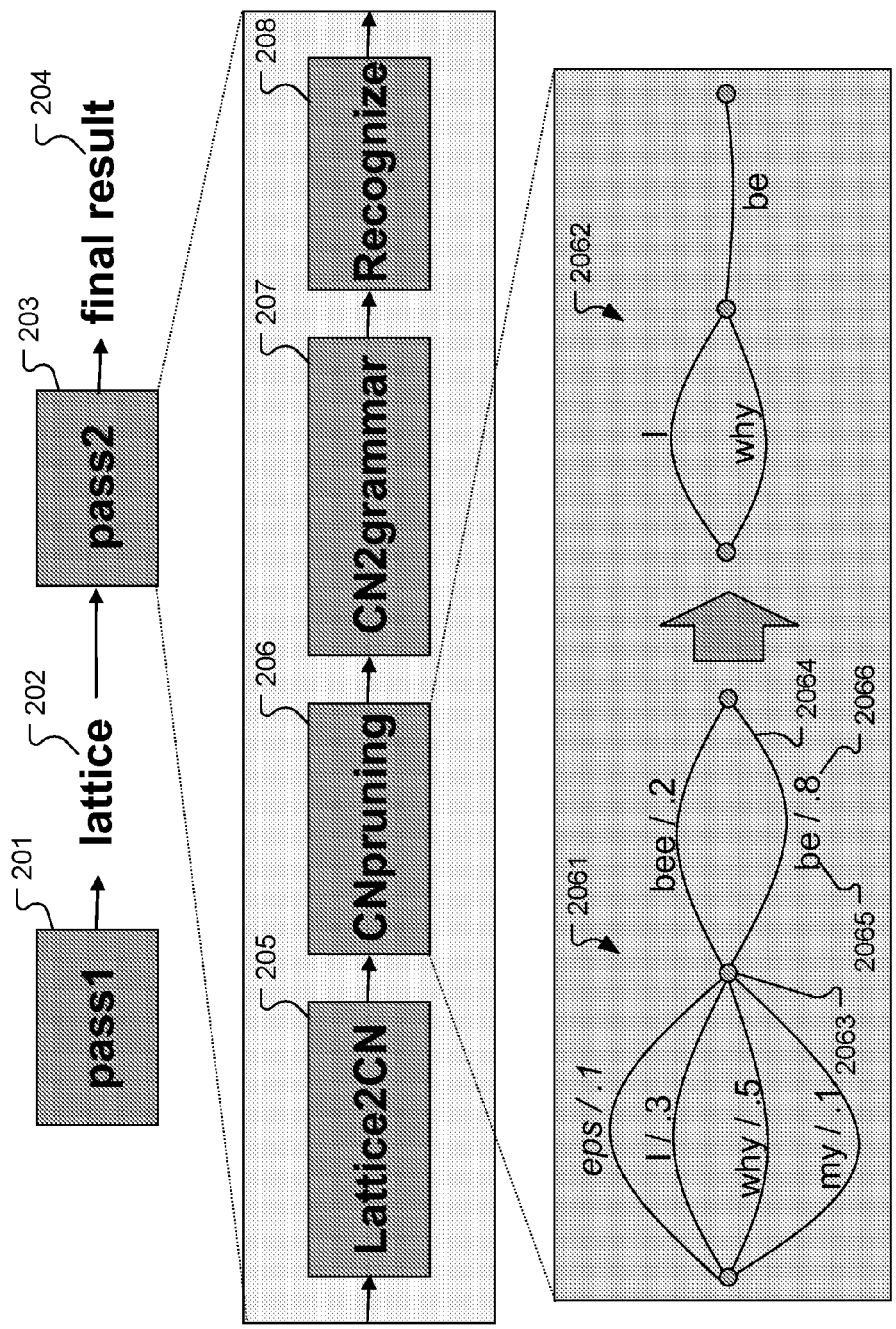
FIG. 2 illustrates confusion network pruning applied in an embodiment of the present invention as a means of constructing a grammar that constrains the re-evaluating recognition pass to only the similarly likely options according to the first pass result.

FIG. 2 illustrates a specific embodiment where an initial recognizer 201 performs an initial speech recognition pass on an input speech utterance to determine an initial recognition result corresponding to the input speech utterance. In this case, the initial recognition result is in the specific form of a confusion network 202 with arcs having an associated probability values reflecting the confidence of the initial recognition result which can be exploited as a reliability measure to determine the similar likely first pass result options that are to be re-assessed by the second pass recognizer Note that that the initial recognizer 201 is not necessarily a single individual recognizer, but in some embodiments may usefully be an arrangement of multiple recognizers that together yield a combined initial recognition result from multiple parallel or successive recognition passes. And specific embodiments also are not necessarily limited to using confusion network based posterior probabilities, and, in fact, any scheme for identifying regions with similarly likely options in the first pass recognition result can be applied.

For portions of the initial recognition result confusion network 202 where the reliability measure is below some threshold value (i.e., second-best arc probabilities are similar to respective (parallel) best arc probabilities), a re-evaluation recognizer 203 performs a re-evaluation recognition pass on the corresponding portions of the input speech utterance to determine a re-evaluation recognition result corresponding to the re-evaluated portions of the input speech utterance. The initial recognizer 201 and the re-evaluation recognizer 203 are complementary so as to make different recognition errors. A final recognition result 204 is determined based on the re-evaluation recognition result if any, and otherwise based on the initial recognition result.

Looking more specifically within the re-evaluation recognizer 203, the initial recognition result confusion network 202 includes nodes 2063 that represent word boundaries and which are connected by arcs 2064 representing different vocabulary words as indicated by their respective arc labels 2065 and associated arc probabilities 2066. A set of parallel arcs 2064 between two sequential nodes 2063 is referred to as a slot, which represents the different likely words present during that portion of the speech input. In FIG. 2, the confusion network 202 is used as a second pass input network 205, a portion of which is shown as example input network 2061. In the first slot between the first two nodes 2063, the highest probability path is the arc label 2065 for "why" having an arc probability 2066 of 0.5, followed by "I" at 0.3, and "my" and "eps" (silence) at 0.1 each. The next slot between the second and third nodes 2063 has just two possible arcs 2064: "be"=0.8 and "bee"=0.2 (note the separate arcs 2064 for homonyms). In the embodiment in FIG. 2, the re-evaluation recognizer 203 performs a pruning 206 of unlikely or unreliable arcs 2064 in each slot, specifically, those with an arc probability 2066 less than half the arc probability 2066 of the best probability arc 2064. So in the example input network 2061, the best arc probability 2066 in the first slot is "why"=0.5. The next best arc probability 2066 "I"=0.3 is within half of 0.5 and so is preserved, but "my" and "eps"=0.1 are both less than half of 0.5 and so are pruned. Similarly in the second slot, "bee"=0.2 is less than half of "be"=0.8 and so is pruned, thereby producing the example pruned network 2062. The pruned network 2062 in effect defines a re-evaluation grammar 207 for a second decoding pass with re-evaluation recognizer 208 having a different complementary acoustic model and re-scoring only the unreliably recognized portions of the initial recognition result confusion network 202 having low posterior probabilities.

In some experiments performed in a dictation scenario, there were reliable improvements in WERR of 4-5%, whether with constrained rescoring of a grammar based on a pruned confusion network resulting from a single recognition pass, or with constrained rescoring of a grammar based on a confusion network combination (CNC) result itself. These improvement results approach the accuracy improvements observed for more complicated and expensive system combination approaches such as CNC and ROVER.

Figure 3:
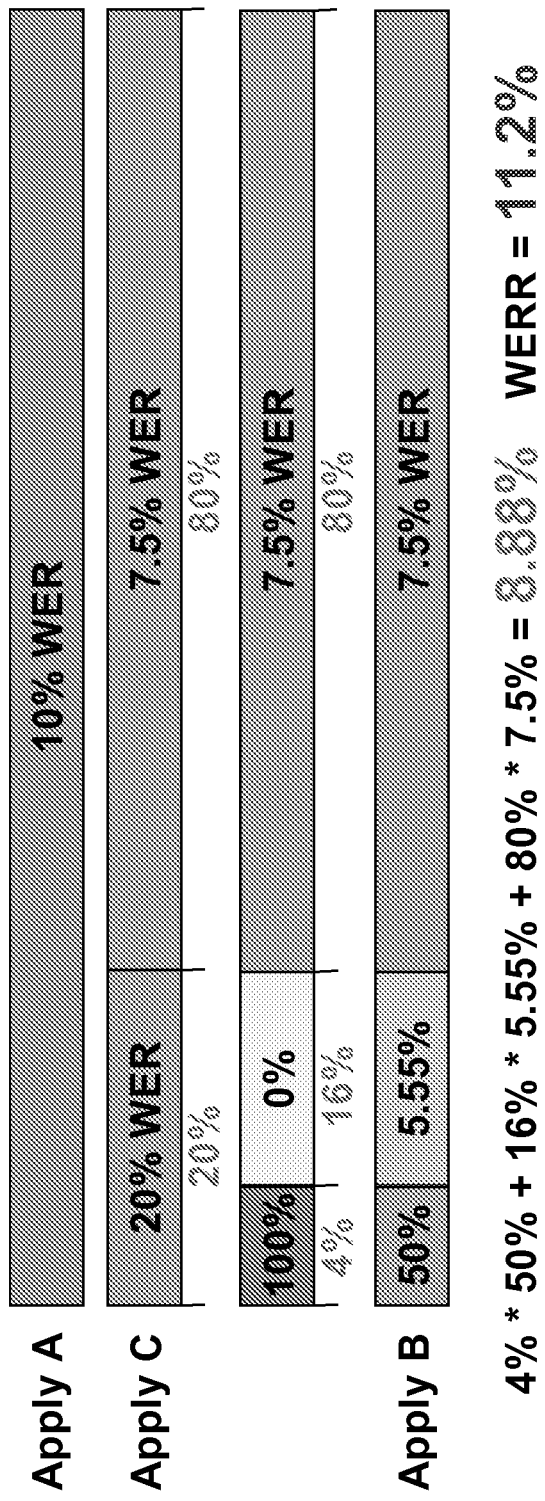
FIG. 3 shows that an embodiment can yield a system performance gain even where the complementary re-evaluation recognizer does not perform better than the initial recognizer.

FIG. 3 supports an intuitive explanation of why this approach can yield improved system performance even when the models in the re-evaluation recognizer 203 are no better than for the initial recognizer 201. Assume hypothetically that there are two different complementary recognizers/classifiers, which we will refer to as A and B, both have 10% error rates and that errors are correlated in a way so that there is an overlap of 50%. This means that where A is wrong, B has a 50% chance of also being wrong, and where A is correct, B has a chance of 5/90=5.55% being wrong. Then further assume that reliability measure C for A allows filtering out 10% of the data on which A has 50% error. Then, exploiting the reliability measure C, the data can be split as shown in FIG. 3 into 10% and 90% parts as shown, where the 90% part has half the error, so WER is 5.55%, and the 10% part has the other half the error so that the WER there is 50%. Then the 10% part can be re-evaluated (rescored) with the second recognizer B. We know that in this 10% part, half is error and half is correct, so for the errors, the chance of error with B is 50%, the chance of error for what is correct is 5/90. We get that the error of B on the low confidence 10% from A is then: ½*50%+½*5/90=27.77%. This gives an overall error of: 90%*5.55%+10%*27.77%=7.77%. This is a 2.33% absolute and 23.3% relative reduction over the baseline 10% error rate.

In some embodiments, rather than automatically using the re-evaluation recognition results when available, it might make sense to combine scores, likelihoods or posterior estimates of the initial recognition results and the re-evaluation recognition results into a combined final recognition result. This option may not always be workable though. When the re-evaluation recognizer only rescores a small portions of the input speech, say just a couple of words, it is rather difficult to derive a good meaningful reliability measure, and attempting to compute a better one requires additional computational resources. So it may be difficult to obtain acceptable confidence in the sense of probability estimates for both recognizers. But there still would at least be acoustic model scores from the re-evaluation recognizer that could be combined with those from the initial recognizer or with the proper reliability measure from the first pass. In the end, such efforts may or may not deliver additional improvement in system performance.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

For example, a pseudo code representation of a generic embodiment might be set forth as follows:
Process Reliability Rescoring
  perform initial speech recognition pass of input speech audio for each confusion network slot with most likely arc probability similar to next best arc probability:
    re-evaluate corresponding input speech audio with complementary re-evaluation recognizer;
  where re-evaluation recognition result available, final recognition result=re-evaluation recognition result, otherwise, final recognition result=initial recognition result.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for speech recognition implemented as a plurality of computer processes functioning in a computer processor, the method comprising:
  converting an analog signal corresponding to speech input received at a microphone into a digital signal corresponding to the received speech input;
  in one or more computer processes:
    using an initial recognizer to perform an initial speech recognition pass on a portion of the digital signal corresponding to an input speech utterance of the speech input to determine:
      i. an initial recognition result corresponding to the input speech utterance, and
      ii. a reliability measure reflecting a per word reliability of the initial recognition result;
    subsequent to completion of the initial speech recognition pass, for portions of the initial recognition result where the reliability measure is low,
    using a re-evaluation recognizer to perform a re-evaluation recognition pass on the corresponding portions of the input speech utterance to determine a re-evaluation recognition result corresponding to the re-evaluated portions of the input speech utterance,
    wherein the initial recognizer and the re-evaluation recognizer are complementary so as to make different recognition errors; and determining a final recognition result based on the re-evaluation recognition result if any, and otherwise based on the initial recognition result.

2. A method according to claim 1, wherein the initial recognition result includes a confusion network.

3. A method according to claim 2, wherein the confusion network includes arcs having associated arc probabilities that are used for the reliability measure.

4. A method according to claim 3, wherein the reliability measure is low when second best arc probability is higher than approximately half the best arc probability.

5. A method according to claim 1, wherein the initial recognizer includes a plurality of combined recognizers that yield a combined recognition result to form the initial recognition result.

6. A method according to claim 1, wherein the method is performed in an online real time speech recognition application.

7. A method according to claim 6, wherein the speech recognition application is a dictation application.

8. A method according to claim 1, wherein the method is performed in an offline batch mode speech recognition application.

9. A method according to claim 1, wherein the initial recognizer and the re-evaluation recognizer use different complementary acoustic models.

10. A method according to claim 1, wherein the initial recognizer and the re-evaluation recognizer use different complementary language models.

11. A speech recognition system comprising:
at least one processor;
an analog-to-digital converter configured to convert an analog signal corresponding to speech input received at a microphone into a digital signal corresponding to the received speech input; and
memory storing program code that, when executed by the at least one processor, causes the system to
perform, using an initial recognizer, an initial speech recognition pass on a portion of the digital signal corresponding to an input speech utterance of the speech input to determine i) an initial recognition result corresponding to the input speech utterance, and ii) a reliability measure reflecting a per word reliability of the initial recognition result,
perform, using a re-evaluation recognizer subsequent to completion of the initial speech recognition pass, a re-evaluation recognition pass on portions of the initial recognition result where the reliability measure is low to determine a re-evaluation recognition result corresponding to the re-evaluated portions of the input speech utterance, and
determine a final recognition result based on the re-evaluation recognition result if any, and otherwise based on the initial recognition result;
wherein the initial recognizer and the re-evaluation recognizer are complementary so as to make different recognition errors.

12. The speech recognition system of claim 11, wherein the initial recognition result includes a confusion network.

13. The speech recognition system of claim 12, wherein the confusion network includes arcs having associated arc probabilities that are used for the reliability measure.

14. The speech recognition system of claim 13, wherein the reliability measure is low when second best arc probability is higher than approximately half the best arc probability.

15. The speech recognition system of claim 11, wherein the initial recognizer and the re-evaluation recognizer use one of different complementary acoustic models or different complementary language models.

16. One or more non-transitory computer storage media storing computer readable instructions that, when executed, perform a speech recognition method comprising:
converting an analog signal corresponding to speech input received at a microphone into a digital signal corresponding to the received speech input;
performing, using an initial recognizer, an initial speech recognition pass on a portion of the digital signal corresponding to an input speech utterance of the speech input to determine i) an initial recognition result corresponding to the input speech utterance, and ii) a reliability measure reflecting a per word reliability of the initial recognition result;
performing, using a re-evaluation recognizer subsequent to completion of the initial speech recognition pass, a re-evaluation recognition pass on portions of the initial recognition result where the reliability measure is low to determine a re-evaluation recognition result corresponding to the re-evaluated portions of the input speech utterance; and
determining a final recognition result based on the re-evaluation recognition result if any, and otherwise based on the initial recognition result;
wherein the initial recognizer and the re-evaluation recognizer are complementary so as to make different recognition errors.

17. The computer storage media of claim 16, wherein the initial recognition result includes a confusion network.

18. The computer storage media of claim 17, wherein the confusion network includes arcs having associated arc probabilities that are used for the reliability measure.

19. The computer storage media of claim 18, wherein the reliability measure is low when second best arc probability is higher than approximately half the best arc probability.

20. The computer storage media of claim 16, wherein the initial recognizer and the re-evaluation recognizer use one of different complementary acoustic models or different complementary language models.

* * * * *